(12) United States Patent
Mei et al.

(10) Patent No.: US 7,742,659 B2
(45) Date of Patent: Jun. 22, 2010

(54) EDGE BASED AUTO ORDER SUPPORTING ROTATION ALGORITHM

(75) Inventors: Qipeng Mei, Zhejiang (CN); Weining Sun, Zhejiang (CN)

(73) Assignee: ArcSoft, Inc., Fremont, CA (US)

( * ) Notice: Subject to any disclaimer, the term of this patent is extended or adjusted under 35 U.S.C. 154(b) by 1068 days.

(21) Appl. No.: 11/431,197

(22) Filed: May 9, 2006

(65) Prior Publication Data
US 2007/0263233 A1    Nov. 15, 2007

(51) Int. Cl.
G06K 9/32 (2006.01)
(52) U.S. Cl. .................. 382/294; 382/296; 382/297
(58) Field of Classification Search .......... 382/284, 382/289, 297
See application file for complete search history.

(56) References Cited

U.S. PATENT DOCUMENTS

| | | | | |
|---|---|---|---|---|
| 5,611,033 A * | 3/1997 | Pitteloud et al. | ............ | 345/629 |
| 5,974,199 A * | 10/1999 | Lee et al. | ............ | 382/289 |
| 6,075,905 A * | 6/2000 | Herman et al. | ............ | 382/284 |
| 6,205,259 B1 * | 3/2001 | Komiya et al. | ............ | 382/284 |
| 6,215,914 B1 * | 4/2001 | Nakamura et al. | ........ | 382/284 |
| 6,249,360 B1 * | 6/2001 | Pollard et al. | ............ | 358/473 |
| 6,295,367 B1 * | 9/2001 | Crabtree et al. | ............ | 382/103 |
| 6,493,469 B1 * | 12/2002 | Taylor et al. | ............ | 382/284 |
| 6,549,681 B1 * | 4/2003 | Takiguchi et al. | ........ | 382/294 |
| 6,690,482 B1 * | 2/2004 | Toyoda et al. | ............ | 358/1.2 |
| 6,975,434 B1 * | 12/2005 | Pilu et al. | ............ | 358/474 |
| 7,184,091 B2 * | 2/2007 | Matsuda et al. | ............ | 348/369 |
| 2003/0160760 A1 * | 8/2003 | Takakura et al. | ........ | 345/158 |

OTHER PUBLICATIONS

A Stitching algorithm of—images from swaying camera,Yinghui et al., Oct. 17, 2005,SPIE, vol. 5985,Abstract.*

* cited by examiner

*Primary Examiner*—Samir A Ahmed
*Assistant Examiner*—Jayesh Patel
(74) *Attorney, Agent, or Firm*—Patent Law Group LLP; David C. Hsia

(57) ABSTRACT

A method is provided to automatically arrange scanned images so they can be stitched into a composite image. Initially the scanned images are reduced to low resolution and a gradient filter is applied. One scanned image is selected as a possible first image in a stitching order. The possible first image is rotated to one angle and correlated with remaining scanned images rotated to two corresponding angles. Only four scanned images that best correlate with the possible first image and pass a threshold are saved as possible second images in the order. The steps are repeated for subsequent places in the order and for the possible first image at other angles. The method is repeated for other possible first images to form other orders. At the end, a path through one of the orders that produces the best sum of correlation values is set as the correct stitching order.

24 Claims, 18 Drawing Sheets

EDGE BASED AUTO ORDER SUPPORTING ROTATION ALGORITHM

FIELD OF INVENTION

This invention relates to software for scanners, and more specifically to software that automatically orders scanned images of a document so they can be stitched into a complete image of the document.

DESCRIPTION OF RELATED ART

In general, the maximum document size of a flatbed scanner is letter or A4. When a document is larger than the maximum document size, it can be scanned into several smaller images and then stitched together by software to form a complete image of the original document. For example, a legal size document can be scanned into two A4 size images, and an A3 size document can be scanned into three A4 size images. Scanning one large document into several smaller images leads to two issues.

First, the scanned images may have different angles relative to each other. Thus, some of the scanned images may need to be rotated before they can be stitched together. Second, the order in which the original document is scanned may not correspond to the order in which the scanned images are stitched. Thus, the scanned images may need to be rearranged before they can be stitched together.

In most stitching tools, user intervention is required to resolve these two issues. When the angles of the scanned images are different, the user manually rotates them to the appropriate angles before applying the stitching software. When the scanning order is different from the stitching order, the user manually arranges the scanned images in the appropriate order before applying the stitching software.

To speed up this process and limit user intervention, a method is provided to automatically rotate and arrange scanned images in order to stitch them into a complete image of an original document.

BRIEF DESCRIPTION OF THE DRAWINGS

Use of the same reference numbers in different figures indicates similar or identical elements.

SUMMARY

In one embodiment of the invention, a method is provided to automatically arrange scanned images so they can be stitched into a composite image. Initially the scanned images are reduced to low resolution and a gradient filter is applied. One scanned image is then selected as a possible first image in a stitching order. The possible first image is rotated to one angle and correlated with remaining scanned images rotated to two corresponding angles. Only four scanned images that best correlate with the possible first image and pass a threshold are saved as possible second images in the stitching order. The steps are then repeated for subsequent places in the stitching order and for the possible first image at other angles. The entire method is then repeated for other possible first images to form other stitching orders. At the end, a path through all the stitching orders that produces the best sum of correlation values is set as the correct stitching order.

DETAILED DESCRIPTION

To automatically arrange scanned images so they can be stitched into a complete image of an original document, three basic principles are applied in embodiments of the invention. First, a gradient filter is applied to the scanned images to generate gradient images. Second, the scanned images are matched to each other by correlating their gradient images. Third, the stitching order is determined by an exhaustive search of all combinations of the scanned images where the stitching order is the combination that produces the best sum of correlation values.

Figures 1, 2:
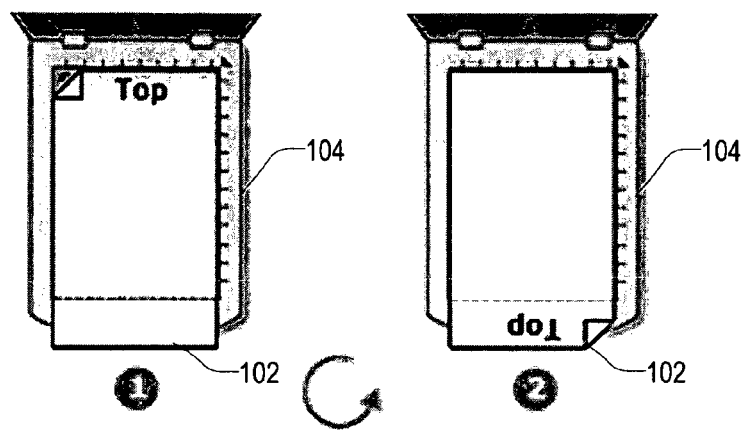
FIGS. 1, 2, 3, 4, 5, 6, 7, 8, 9, 10, 11, 12, 13, 14, and 15 illustrate the scanning of a large document in multiple passes in embodiments of the invention.

Several basic scanning scenarios are first described before the details of the embodiments of the invention are described. FIGS. 1 and 2 illustrate a legal size document 102 scanned in two passes in one embodiment of the invention. In the first pass, document 102 is scanned normally with the top right corner of the document abutting the top right corner of a document table of scanner 104. In the second pass, document 102 is turned upside down with the bottom left corner of the document abutting the top right corner of the document table.

Figures 3, 4, 5:
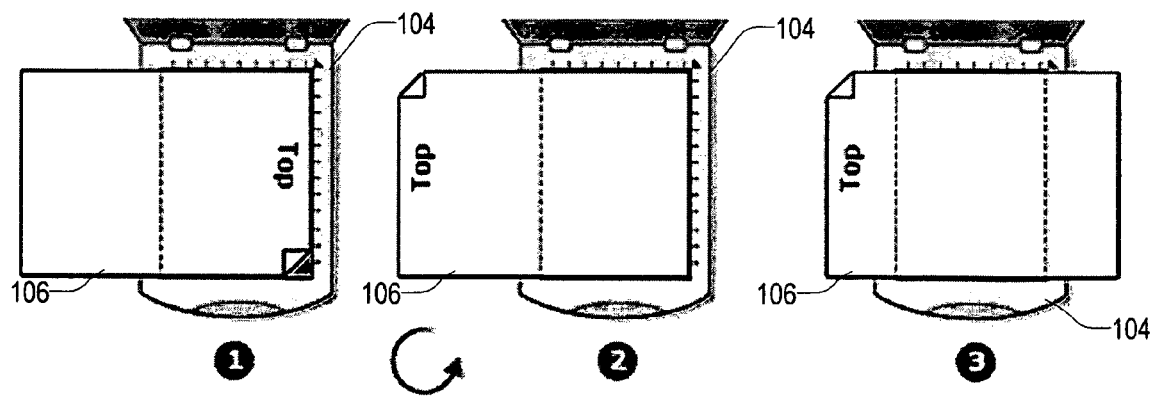
Figures 6, 7, 8, 9:
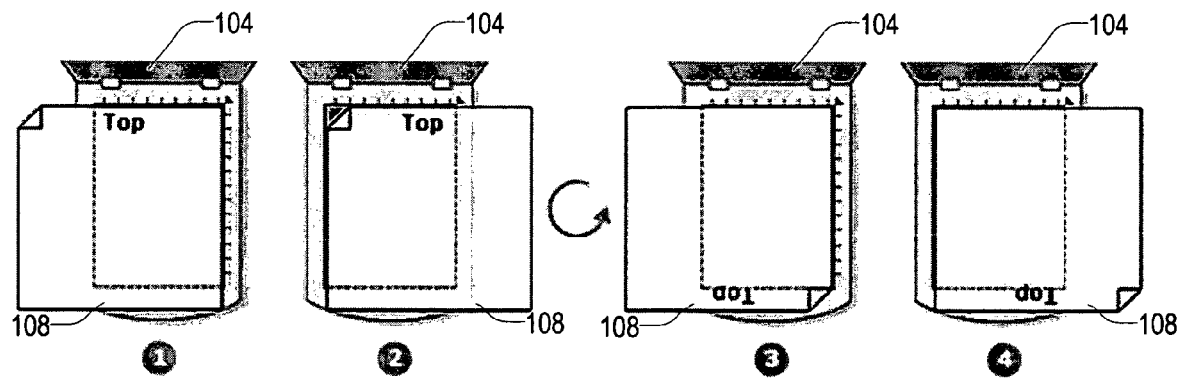

FIGS. 3, 4, and 5 illustrate an A3 size document 106 scanned in three passes in one embodiment of the invention. Document 106 is first rotated 90 degrees clockwise. In the first pass, the top left corner of document 106 abuts the top right corner of the document table of scanner 104. Document 106 is then rotated 180 degrees. In the second pass, the bottom right corner of document 106 abuts the top right corner of the document table. Note that the first and the second scanned images do not overlap. In the third pass, document 106 is centered about the document table.

FIGS. 6 to 9 illustrate a scrapbook size document 108 (e.g., 12" by 12") scanned in four passes in one embodiment of the invention. In the first pass, the top right corner of document 108 abuts the top right corner of the document table of scanner 104. In the second pass, the top left corner of document 108 abuts the top left corner of the document table. In the third pass, document 108 is turned upside down so the bottom left corner of document 108 abuts the top right corner of the document table. In the fourth pass, the bottom right corner abuts the top left corner of the document table.

Figures 10, 11, 12:
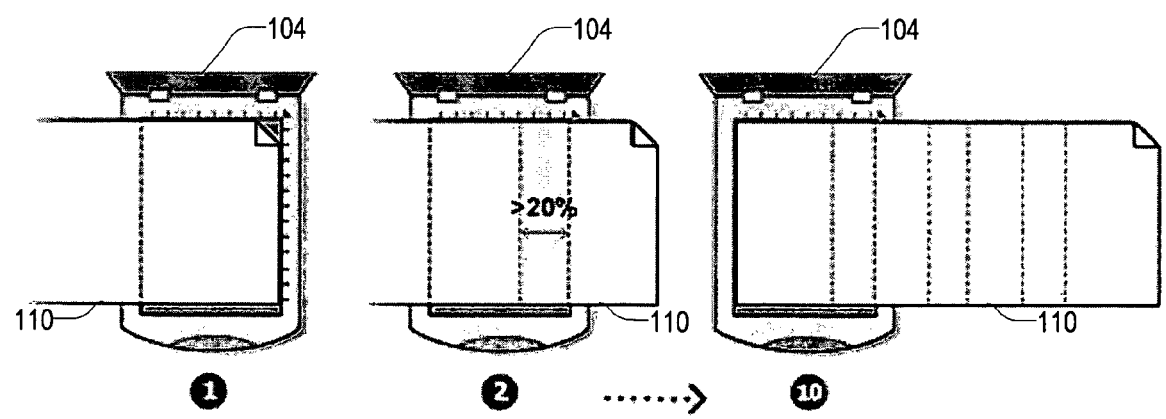

FIGS. 10 to 12 illustrate a long page document 110 scanned in a row of N scanned images in one embodiment of the invention. Document 110 is first rotated 90 degrees clockwise. In the first pass, the top left corner of document 110 abuts the top right corner of the document table of scanner 104. In subsequent passes, the rest of document 110 is scanned along the left edge of the document in overlapping sections with at least 20% overlap between sections.

Figures 13, 14, 15:
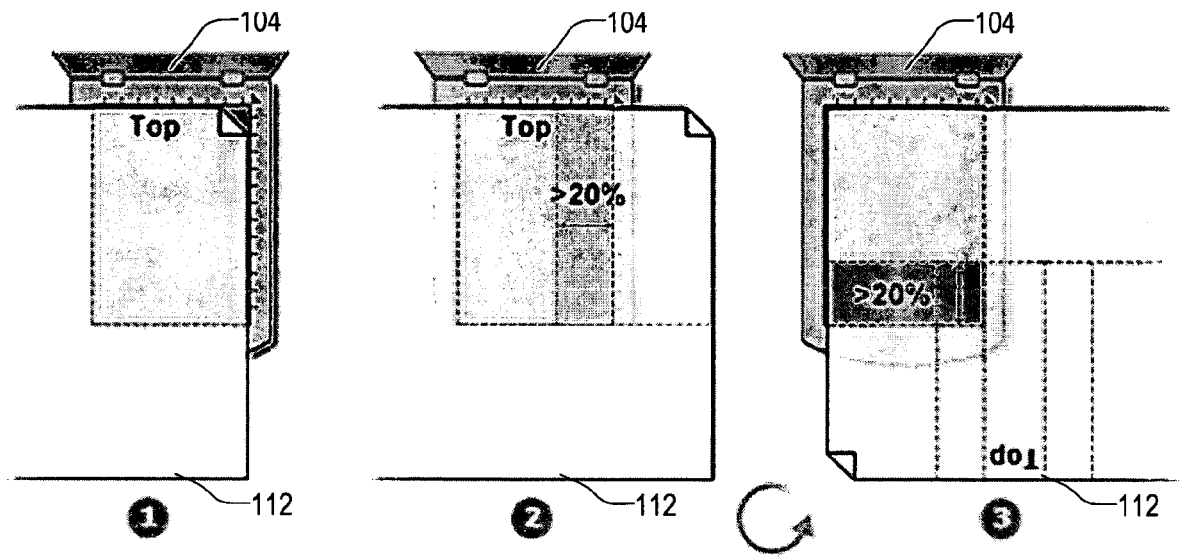

FIGS. 13, 14, and 15 illustrate a poster size document 112 scanned in m rows of n scanned images (e.g., 2 rows of 5 scanned images) in one embodiment of the invention. In the first pass, the top right corner of document 112 abuts the top right corner of the document table of scanner 104. In subsequent passes, document 112 is scanned along the top edge of the document in overlapping sections with at least 20% overlap between sections. Document 112 is then turned upside down and then scanned along the bottom edge of the document in the same manner.

Figure 16:
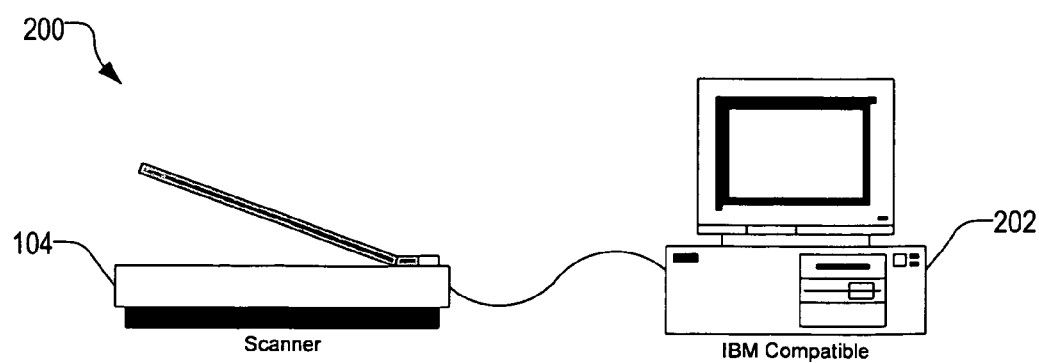
FIG. 16 illustrates a system for automatically arranging scanned images so they can be stitched into a complete image of an original document in one embodiment of the invention.

FIG. 16 shows a system 200 that automatically arranges scanned images in the correct stitching order in one embodiment of the invention. System 200 includes scanner 104 coupled to a computer 202. Scanner 104 is a flatbed scanner with a document table where the document is placed to be scanned. Scanner 104 scans images of the original document in several passes and provides graphic files of the scanned images to computer 202.

Figure 17A:
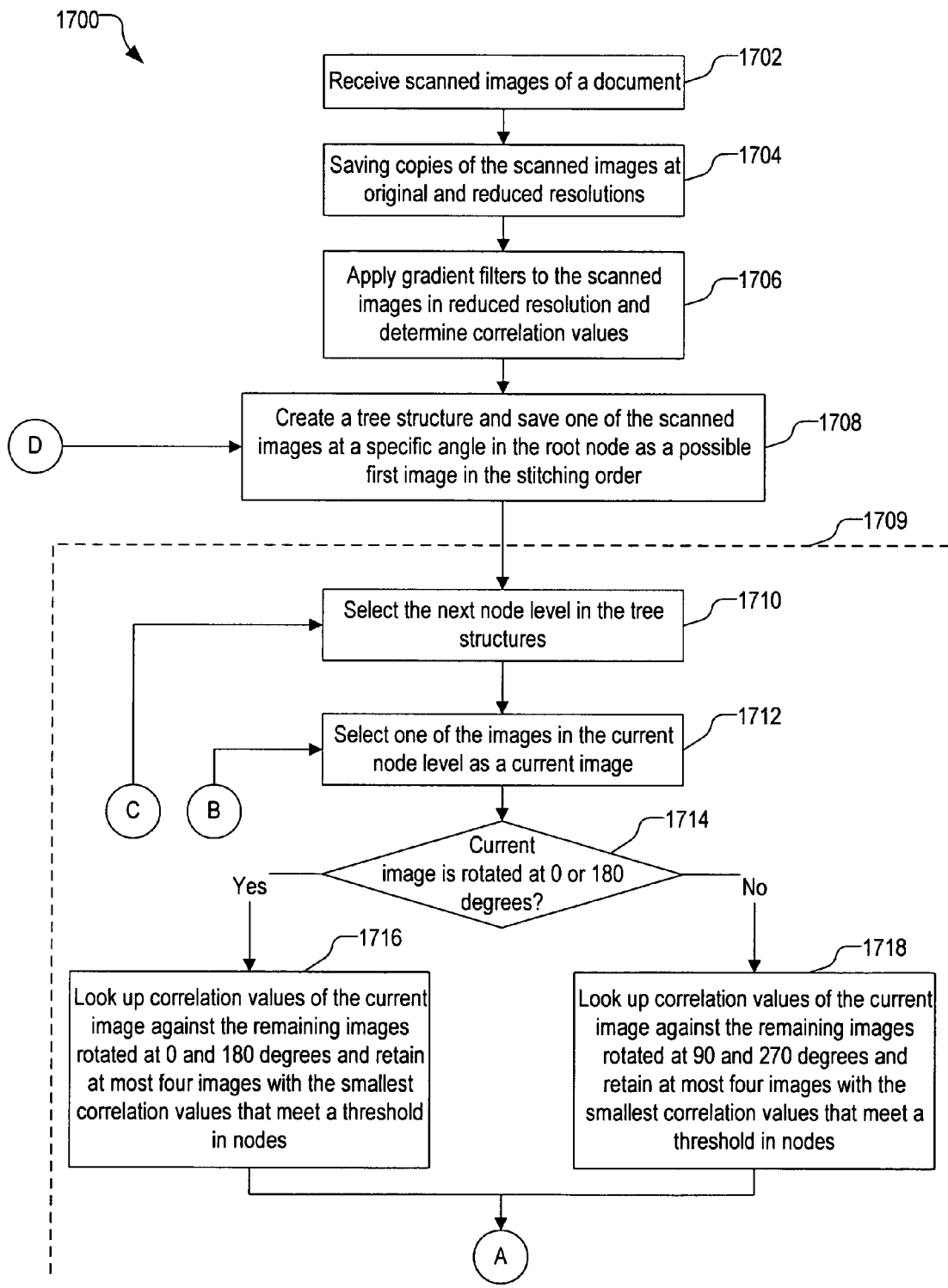
FIGS. 17A and 17B are a flowchart of a method for automatically arranging scanned images in one dimension so they can be stitched into a complete image of an original document in one embodiment of the invention.
Figure 17B:
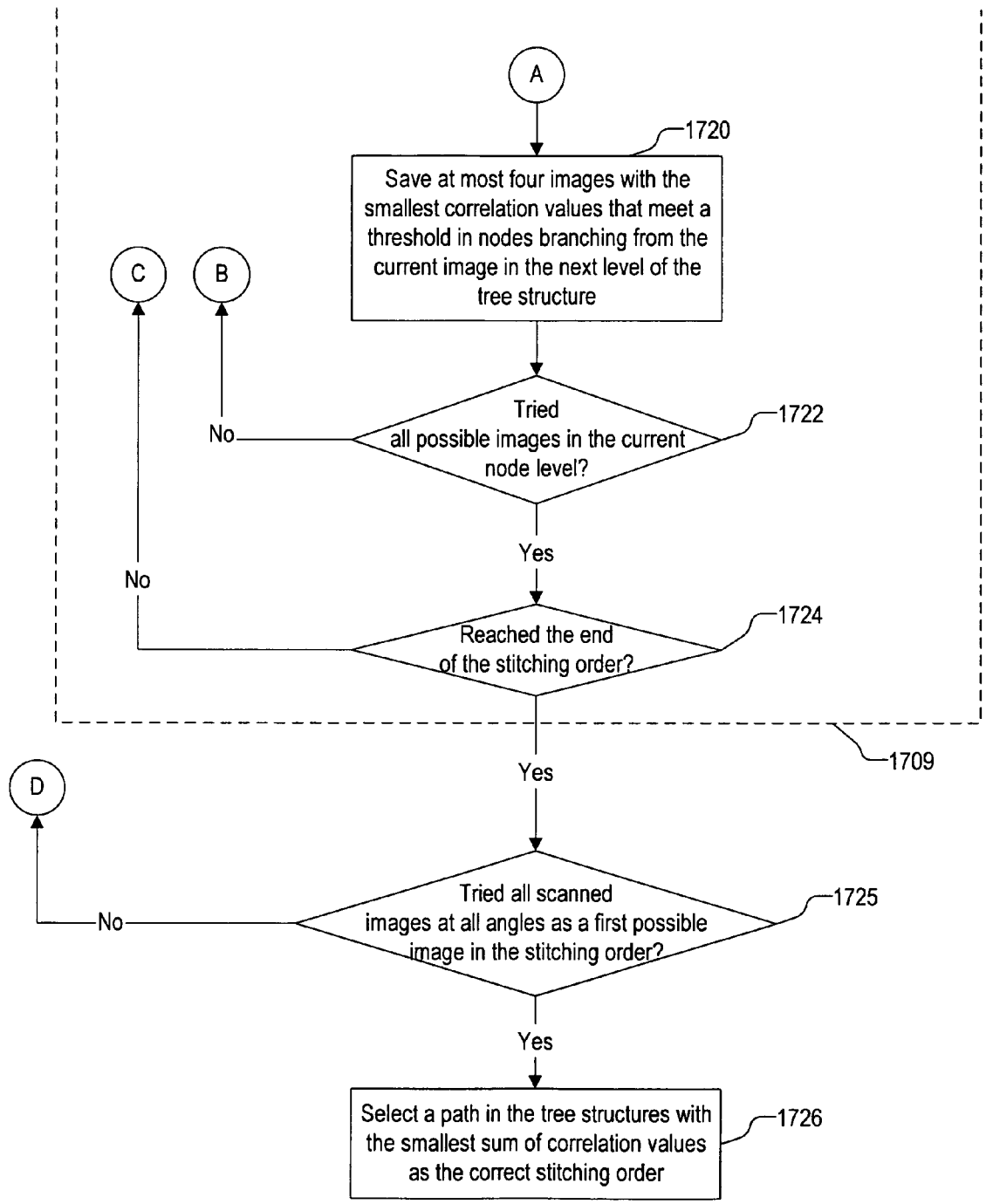

FIGS. 17A and 17B are a flowchart of a method 1700 that automatically arranges scanned images horizontally in a single row so they can be stitched into a complete image of an original document in one embodiment of the invention. The original document can be scanned in a single row or a single column as shown in FIGS. 1 and 2, 3 to 5, and 10 to 12. Method 1700 operates on scanned images that are rotated 0 and 180 degrees, or 90 and 270 degrees, relative to each other. Method 1700 is implemented by software executed on computer 202. Alternatively, method 1700 is implemented by a combination of software and hardware in scanner 104.

In step 1702 (FIG. 17A), computer 202 receives N scanned images of a large document. The scanned images are created with scanner 104 in multiple passes. In one embodiment, a user optionally provides the document size to computer 202 and computer 202 optionally suggests scanning instructions based on the document size. For example, computer 202 can display FIGS. 1 and 2, 3 to 5, or 10 to 12 to guide the user on the scanning. Note that even if the user does not follow the scanning instructions, method 1700 will still provide the correct stitching order. Step 1702 is followed by step 1704.

In step 1704, computer 202 saves the scanned images in their original resolution and in a reduced resolution. Step 1704 is followed by step 1706.

In step 1706, computer 202 applies a gradient filter to the low-res scanned images to generate gradient images of the low-res scanned images. In one embodiment, computer 202 applies a Sobel filter to the low-res scanned images. The Sobel filter is defined as:

$$G(x,y) = |g_x(x,y)| + |g_y(x,y)|,$$

$$\text{where} \begin{cases} g_x(x,y) = I(x+1,y-1) + 2I(x+1,y) + I(x+1,y+1) - \\ \quad I(x-1,y-1) - 2I(x-1,y) - I(x-1,y+1) \\ g_y(x,y) = I(x-1,y+1) + 2I(x,y+1) + I(x+1,y+1) - \\ \quad I(x-1,y-1) - 2I(x,y-1) - I(x+1,y-1), \end{cases}$$

where G( ) is a gradient value of a pixel at the specified pixel coordinates, I( ) is the average value of the color channels of a pixel at the specified pixel coordinates, and x and y are pixel coordinates. All subsequent steps are performed on gradient images of the low-res scanned images, hereafter referred to as simply "scanned images."

Computer 202 then determines the correlation values of each scanned image against the other scanned images and saves the correlation values of each scanned image. The correlation value is defined as:

$$Corr = \frac{1}{N} \sum_{p \in W} |G(p) - G'(p')|,$$

where Corr is a correlation value of a first scanned image against a second scanned image, W is an overlap region between the two scanned images, N is a number of pixels in region W, G(p) is a gradient value of a pixel p in the first scanned image, and G'(p') is a gradient value of a corresponding pixel p' in the second scanned image.

The correlation values are grouped according to the first image of the two images being compared (e.g., image A when image A is placed ahead of image B). Within each group, the correlation values are saved in ascending order to expedite the lookup processes described later.

As the relative angles of the scanned images are unknown, computer 202 determines the correlation values for each pair of scanned images rotated at various angles. Specifically, computer 202 determines the correlation values of each scanned image rotated at 0 and 180 degrees against the other scanned images rotated at 0 and 180 degrees, and computer 202 determines the correlation values of each scanned image rotated at 90 and 270 degrees against the other scanned images rotated at 90 and 270 degrees. Scanned images rotated at 0 and 180 degrees are used to properly arrange scanned images when their source document is scanned in a horizontal manner, such as the A3 document shown in FIGS. 3, 4, and 5. Scanned images rotated at 90 and 270 degrees are used to properly arrange scanned images when their source document is scanned in vertical manner, such as the legal size document shown in FIGS. 1 and 2, since method 1700 is configured to determine the stitching order in a horizontal manner.

Figure 17C:
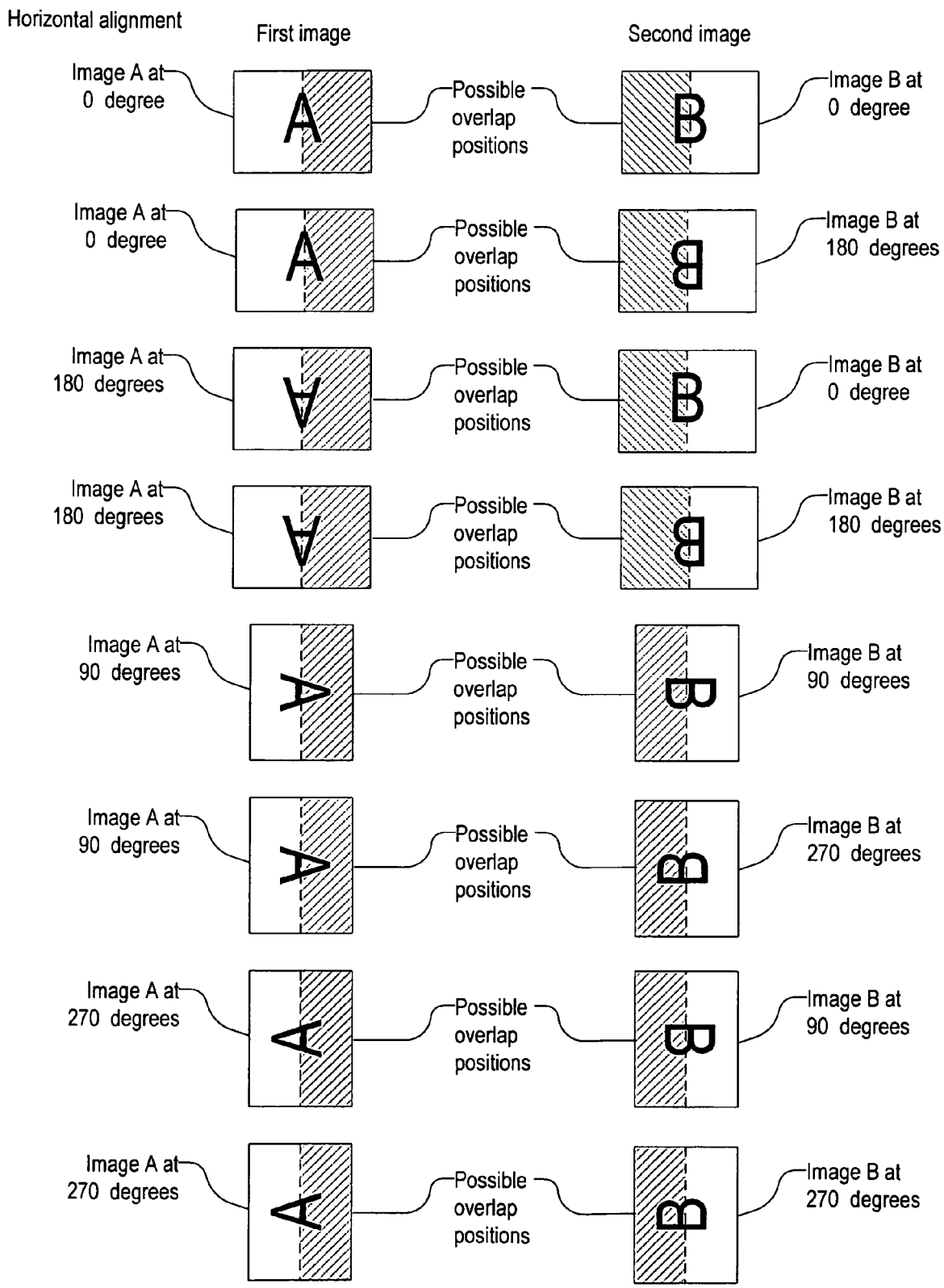
FIGS. 17C and 17D illustrate correlations of scanned images in the method of FIGS. 17A and 17B in one embodiment of the invention.

FIG. 17C illustrates the possible overlap positions between images A and B when image A is placed ahead of image B in a horizontal correlation. For each comparison between images A and B at specific angles, computer 202 determines the correlation values for comparison at all the possible overlapping positions and then selects the smallest difference as the correlation value the first scanned image against the second scanned image. The limited possible overlapping positions prevent the second scanned image from being placed ahead of the first scanned image.

Figure 17D:
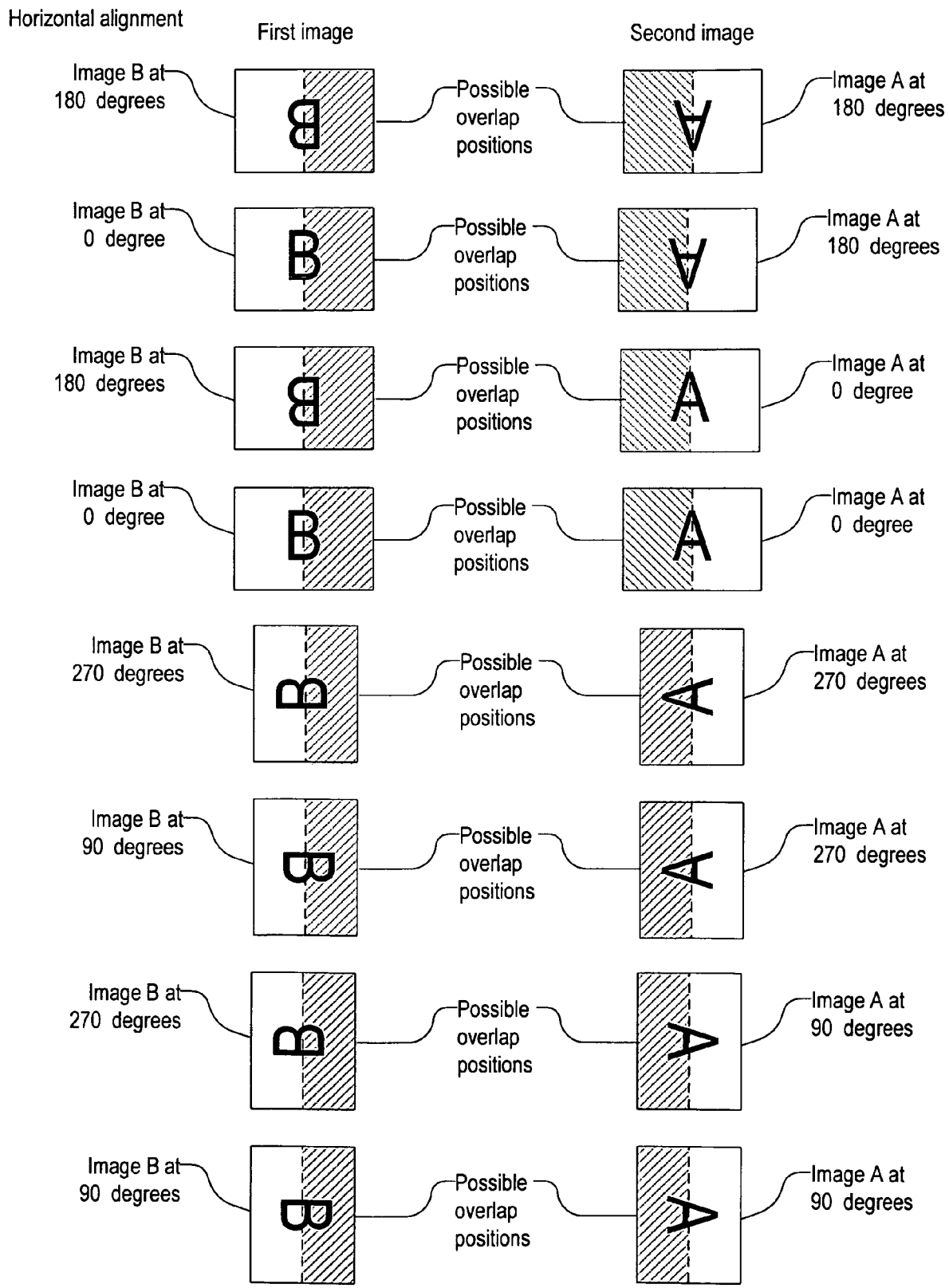

To save time, computer 202 does not calculate the correlation value of every possible comparison since some of them will have the same correlation values. FIG. 17D illustrates that image B placed ahead of image A has the same correlation values as image A placed ahead of image B at corresponding angles in FIG. 17C. Thus, the correlation value of equivalent scenarios need only be calculated once and then saved for all equivalent scenarios. Step 1706 is followed by step 1708.

Figure 18:
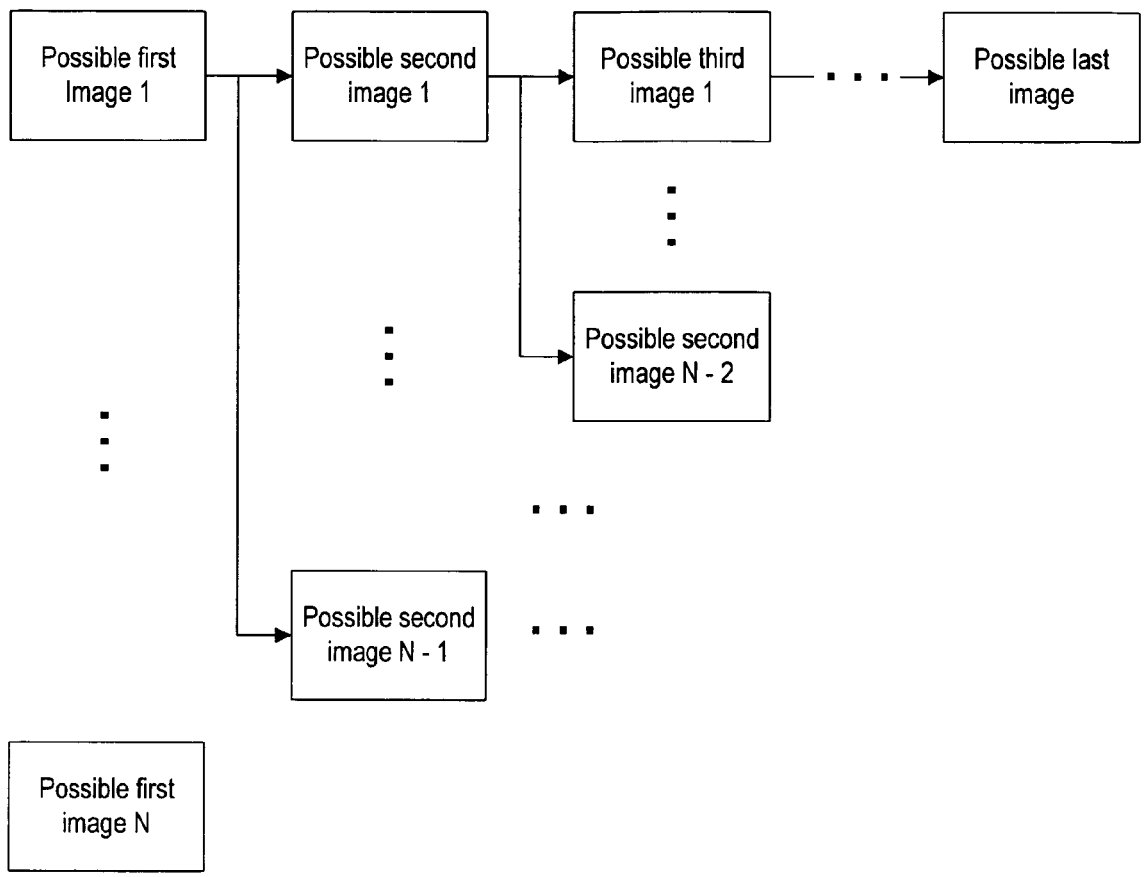
FIGS. 18, 19, and 20 illustrate the reduction of the number of nodes in tree structures generated in the method of FIGS. 17A and 17B in one embodiment of the invention.

In step 1708, computer 202 creates a tree data structure and saves one of the scanned images at a rotational angle in the root node of the tree data structure. In the tree data structure, each node level represents a corresponding place in the stitching order, each node stores a possible image and its rotational angle, and each path from the root node to a leaf node is a possible stitching order. For example, as illustrated in FIG. 18, the root level of the tree data structure represents the first place in the stitching order, and the root node stores a possible first image in the stitching order and the rotational angle of the possible first image. Step 1708 is followed by step 1709.

In step 1709, computer 202 determines the correct stitching order from correlation values of the scanned images. Step 1709 includes steps 1710 to 1724 described below.

In step 1710, computer 202 selects the next node level in the tree data structure. In the first pass through method 1700, the next node level is the root level of the tree data structure. In a subsequent pass through step 1710, the next node level is the level storing scanned images retained in a previous loop through subsequent step 1720. Step 1710 is followed by step 1712.

In step 1712, computer 202 selects one of the scanned images from the current node level as a current image. Computer 202 may select the scanned images from the current node level according to their scanning order. Step 1712 is followed by step 1714.

In step 1714, computer 202 determines if the rotational angle of the current image is 0 or 180 degrees. If so, then step 1714 is followed by step 1716. Otherwise step 1714 is followed by step 1718.

In step 1716, computer 202 looks up the correlation values of the current image against the remaining images rotated at 0 and 180 degrees and retains at most four remaining images with the smallest correlation values that are less than a threshold correlation value. As the correlation values are saved in ascending order, computer 202 can quickly determine the at most four remaining images that meet the above criteria.

Figure 19:
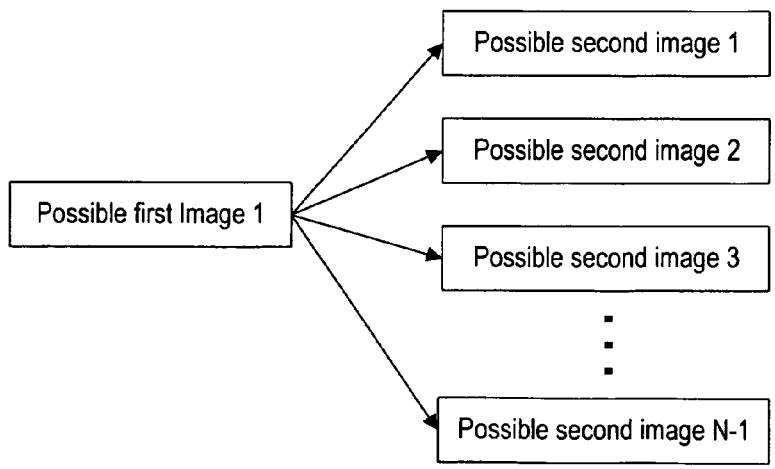
Figure 20:
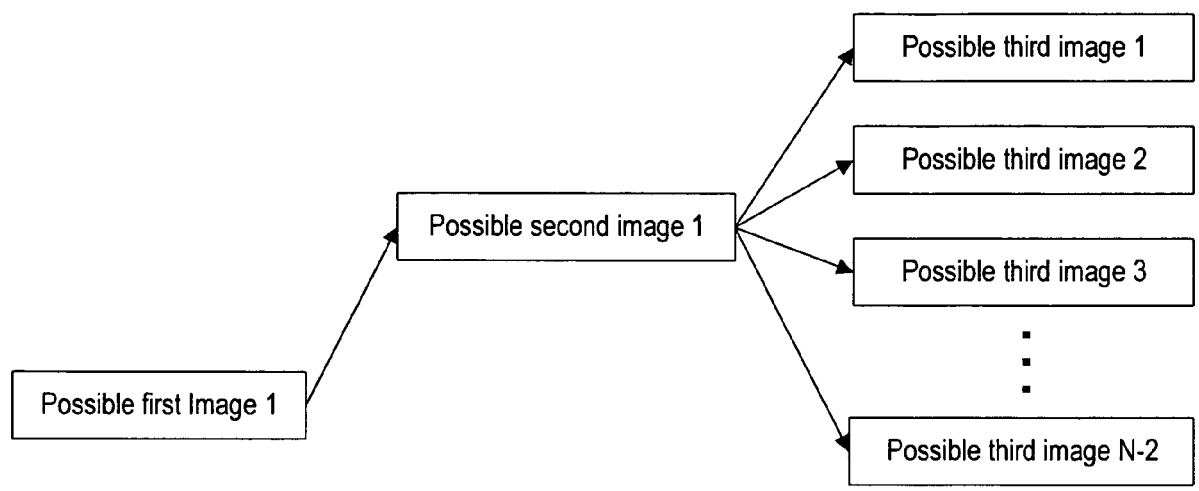

The remaining images are the scanned images excluding the current image and the scanned images upstream from the current image in the data tree structure. As illustrated in FIG. 18, subsequent levels in the tree data structure have N–R scanned images to compare, where R is a variable representing a node level in the tree data structure. FIG. 19 illustrates the correlation of a possible first image with possible second images 1 to N–1, and FIG. 20 further illustrates the correlation of a possible second image 1 with possible third images 1 to N–2. Step 1716 is followed by step 1720.

In step 1718, computer 202 looks up the correlation values of the current image (which is at 90 or 270 degrees) against the remaining images rotated at 90 and 270 degrees and retains at most four remaining images with the smallest correlation values that are less than a threshold correlation value. Step 1718 is the same as step 1716 but for the rotational angles of the remaining images. Step 1718 is followed by step 1720.

In step 1720 (FIG. 17B), computer 202 saves the retained images as possible images next in the stitching order. Computer 202 saves the retained images and their rotational angles in nodes that branch from the current image in the tree data structure. These images become part of the next level in the tree data structure in the next pass through step 1710. Step 1720 is followed by step 1722.

In step 1722, computer 202 determines if it has tried all the scanned images in the current node level of the tree data structure. If not, step 1722 is followed by step 1712 where computer 202 selects another image from the current node level. Otherwise step 1722 is followed by step 1724.

In step 1724, computer 202 determines if it has reached the end of the stitching order. Computer 202 has reached the end of the stitching order when computer 202 has processed the Nth level of the tree data structure. If not, step 1724 is followed by step 1710 where computer 202 selects the next node level in the tree data structure. Otherwise step 1724 is followed by step 1725.

In step 1725, computer 202 determines if it has tried all the scanned images at all possible rotational angles as a first possible image in the stitching order. If not, step 1725 is followed by step 1708 where computer 202 selects another first possible image (a new scanned image or a previous scanned image at a new angle) in the stitching order. Otherwise step 1725 is followed by step 1726.

In step 1726, computer 202 traverses all paths from the root nodes to the leaf nodes of the tree data structures generated above and sums the correlation values in each path. Computer 202 then selects the path that has the smallest sum as the correct stitching order of the scanned images. Computer 202 can use the correct stitching order to create a complete image of the original document and display the complete image to the user.

Although a breadth-first search in the tree data structure is described above, method 1700 can also be implemented with a depth-first search in the tree data structure. Furthermore, although only one tree data structure is created at a time, method 1700 can be implemented to create and process multiple tree data structures in parallel. In addition, method 1700 may be modified to arrange the scanned document vertically in a single column by correlating the images in a vertically manner along their upper and lower perimeters instead of correlating the images in a horizontal manner along their right and left perimeters.

Figure 21A:
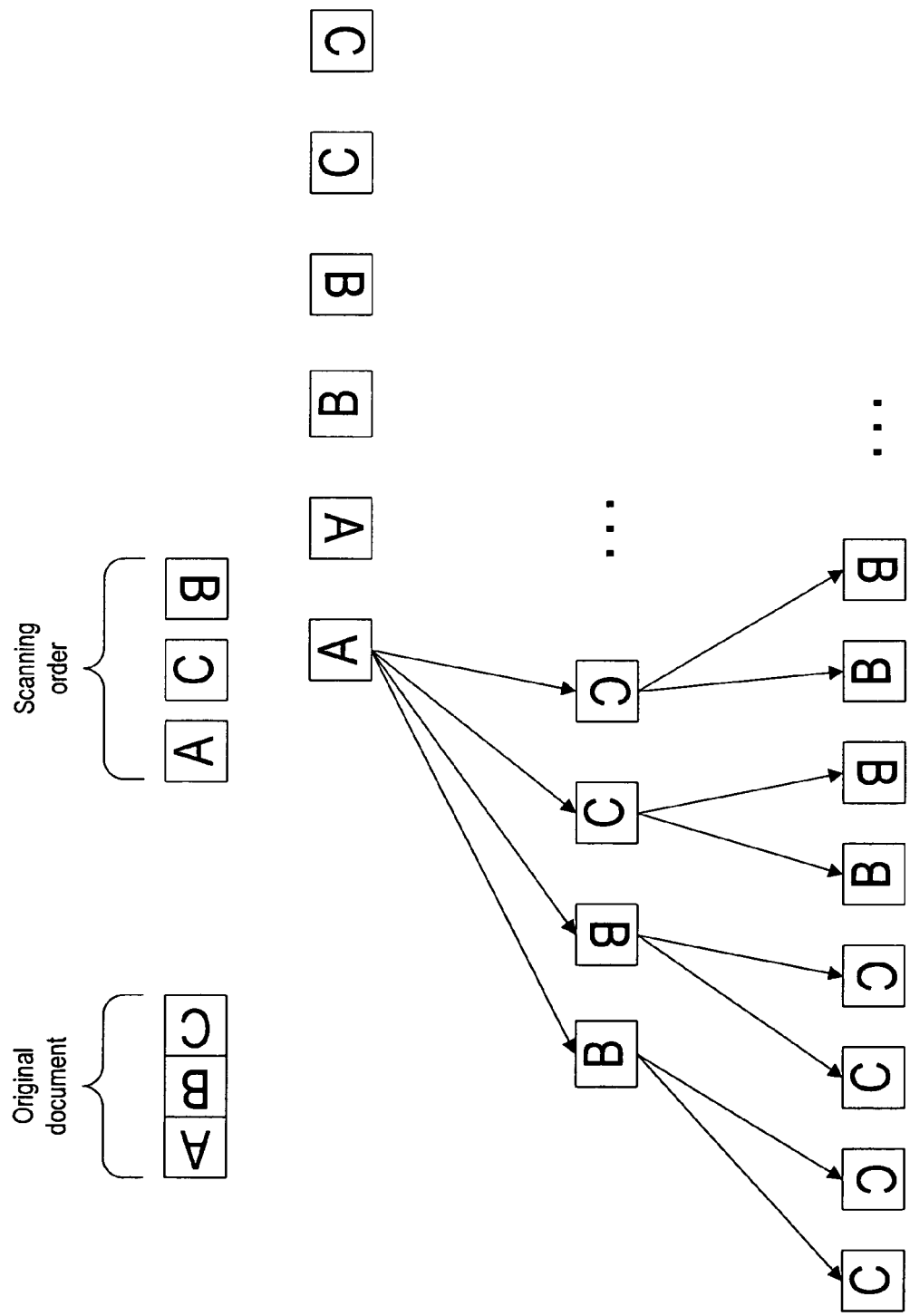
FIGS. 21A and 21B illustrate an example of applying the method of FIGS. 17A and 17B in one embodiment of the invention.
Figure 21B:
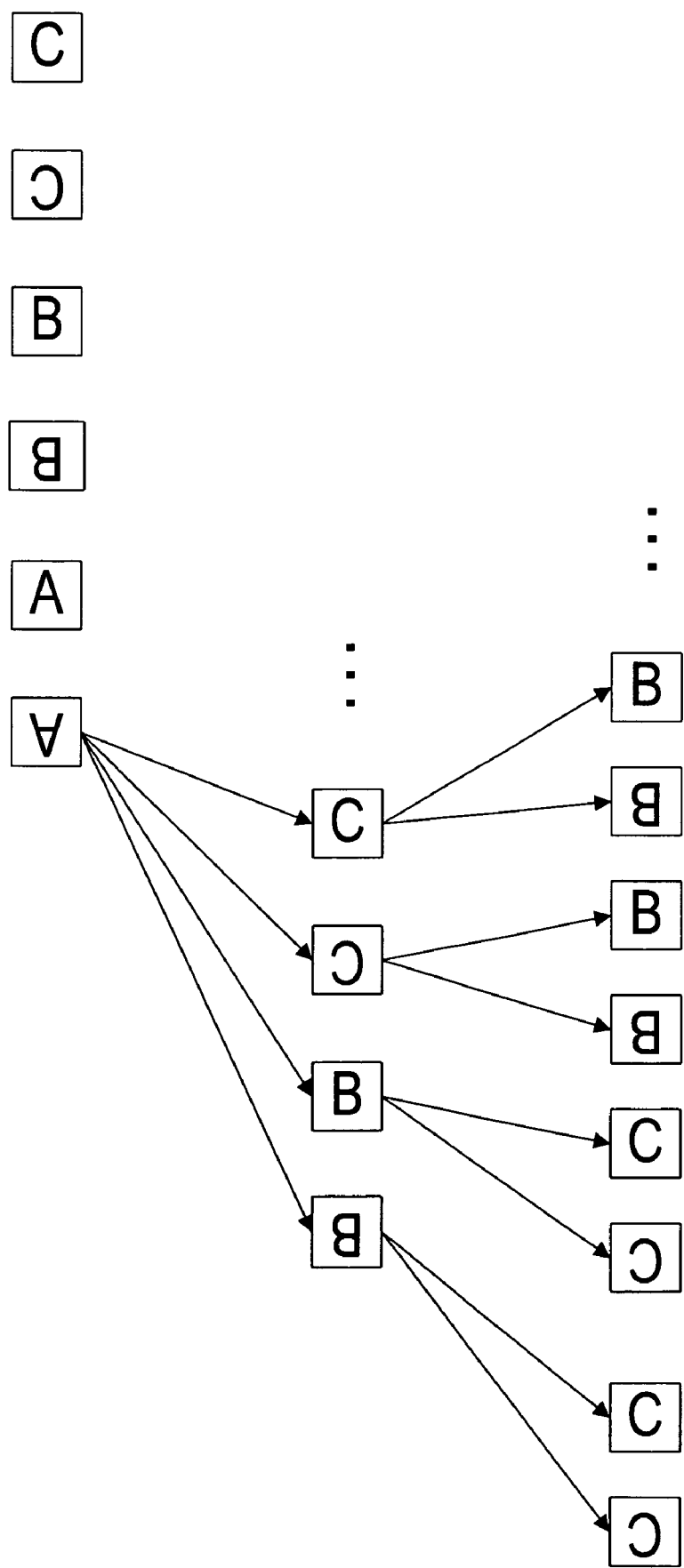

FIGS. 21A and 21B illustrate an example of applying method 1700 to an original document in one embodiment of the invention. As can be seen, the original document is scanned as images A, C, and B in that scanning order with images A and C being at 0 degree and image B at 180 degrees. However, the correct stitching order is scanned images A, B, and C all at 0 degree.

In the first pass through method 1700, images A, B, and C are preprocessed by reducing their resolution and by applying the gradient filter. FIG. 21A shows that images A, B, and C at 0 and 180 degrees are saved in root nodes in six tree data structures (only one is fully illustrated), and FIG. 21B shows that scanned images A, B, and C at 90 and 270 degrees are saved in root nodes in six tree data structures (only one is fully illustrated). For simplicity, the process is now described only for the tree data structure with image A at 0 degree at the root node in FIG. 21A. However, it is understood the same process is repeated for other tree data structures.

Referring to FIG. 21A, the root level is first selected in the tree data structure. Images B and C at 0 and 180 degrees are correlated against image A at 0 degree in the root node, and four correlated images that best matches image A at 0 degree and meet the correlation threshold are retained. The retained images and their angles are saved in nodes in the next level of the tree data structure. Note that while the tree data structure is drawn vertically, the actual alignment is being performed in a horizontal manner where the images are correlated along their right and left perimeters.

The method then repeats in a similar manner for the subsequent levels in the tree data structure. Note that the tree data structure only has 3 levels including the root level because there is a total of 3 scanned images.

After all the tree data structures are generated, the paths through all the tree data structures are traversed and the path with the lowest sum of the correlation values is set as the correct stitching order. Computer 202 can then execute stitching software to create a complete image using the stitching order and the angles of scanned images A, B, and C.

Figure 22A:
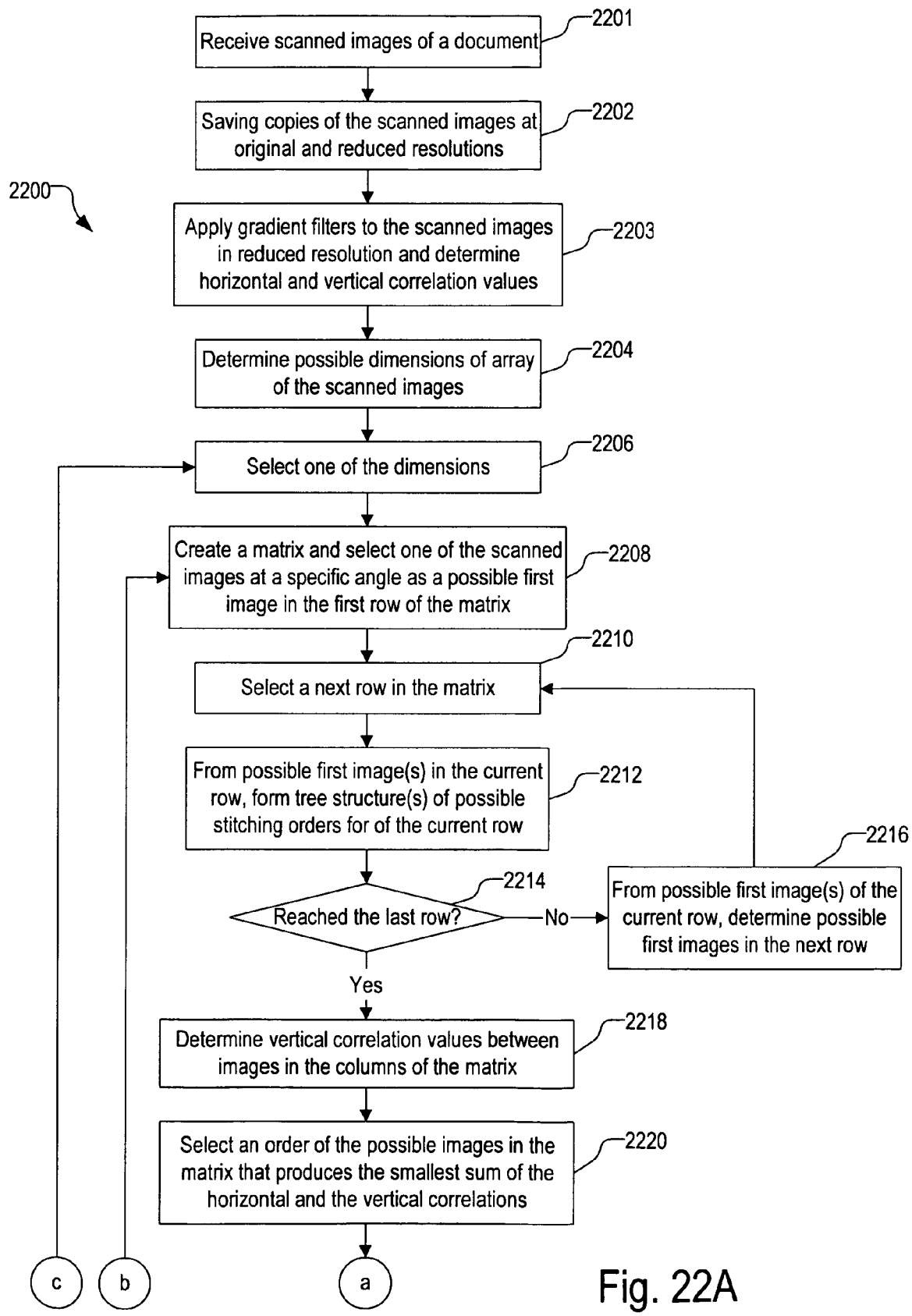
FIGS. 22A and 22B are a flowchart of a method for automatically arranging scanned images in two dimensions so they can be stitched into a complete image of an original document in one embodiment of the invention.
Figure 22B:
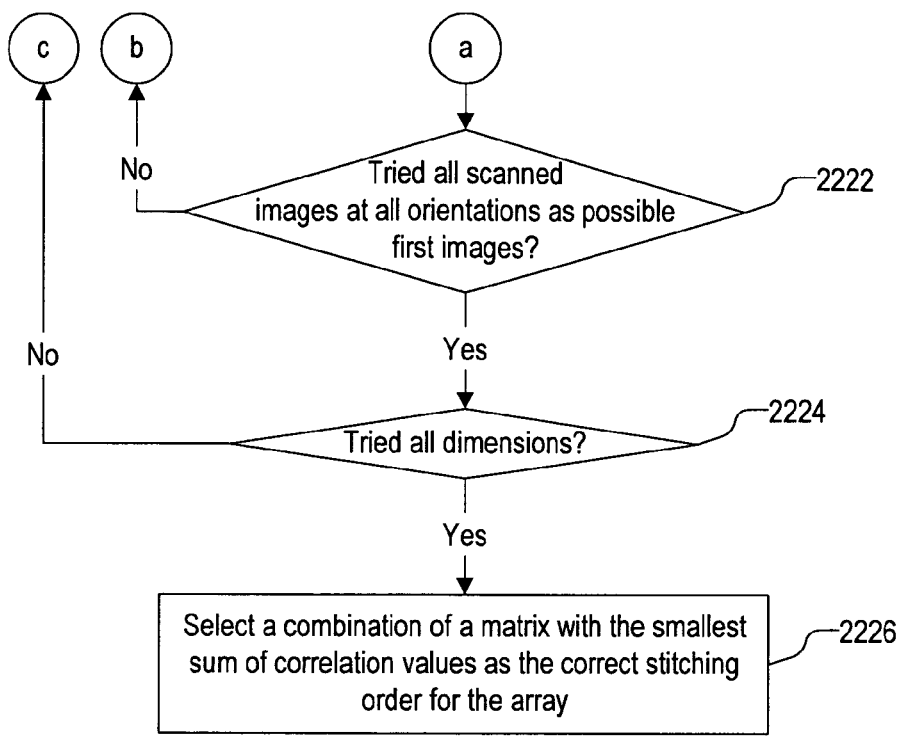

FIGS. 22A and 22B are a flowchart of a method 2200 that automatically arranges scanned images in an array with rows and columns to form a complete image of an original document in one embodiment of the invention.

In step 2201 (FIG. 22A), computer 202 receives m*n of scanned images of a large document. The scanned images are created with scanner 104 in multiple passes. In one embodiment, a user optionally provides the document size to computer 202 and computer 202 optionally suggests scanning instructions based on the document size. For example, computer 202 can display FIGS. 6 to 9 and FIGS. 13 to 15 to guide the user on the scanning. Note that even if the user does not follow the scanning instructions, method 2200 will still provide the correct stitching order. Step 2201 is followed by step 2202.

In step 2202, computer 202 saves the scanned images in their original resolution and in a reduced resolution. Step 2202 is followed by step 2203.

In step 2203, computer 202 applies a gradient filter to the low-res scanned images to generate gradient images of the low-res scanned images. In one embodiment, computer 202 applies a Sobel filter to the low-res scanned images.

Computer 202 then determines the horizontal and the vertical correlation values of each scanned image against the other scanned images. As described above in reference to step 1706 (FIG. 17A), the horizontal correlation value is determined by correlating two scanned images in overlapping areas along their right and left perimeters in a horizontal manner. Similar, a vertical correlation value is determined by correlating two scanned images in overlapping areas long their top and bottom perimeters in a vertical manner.

Figure 25A:
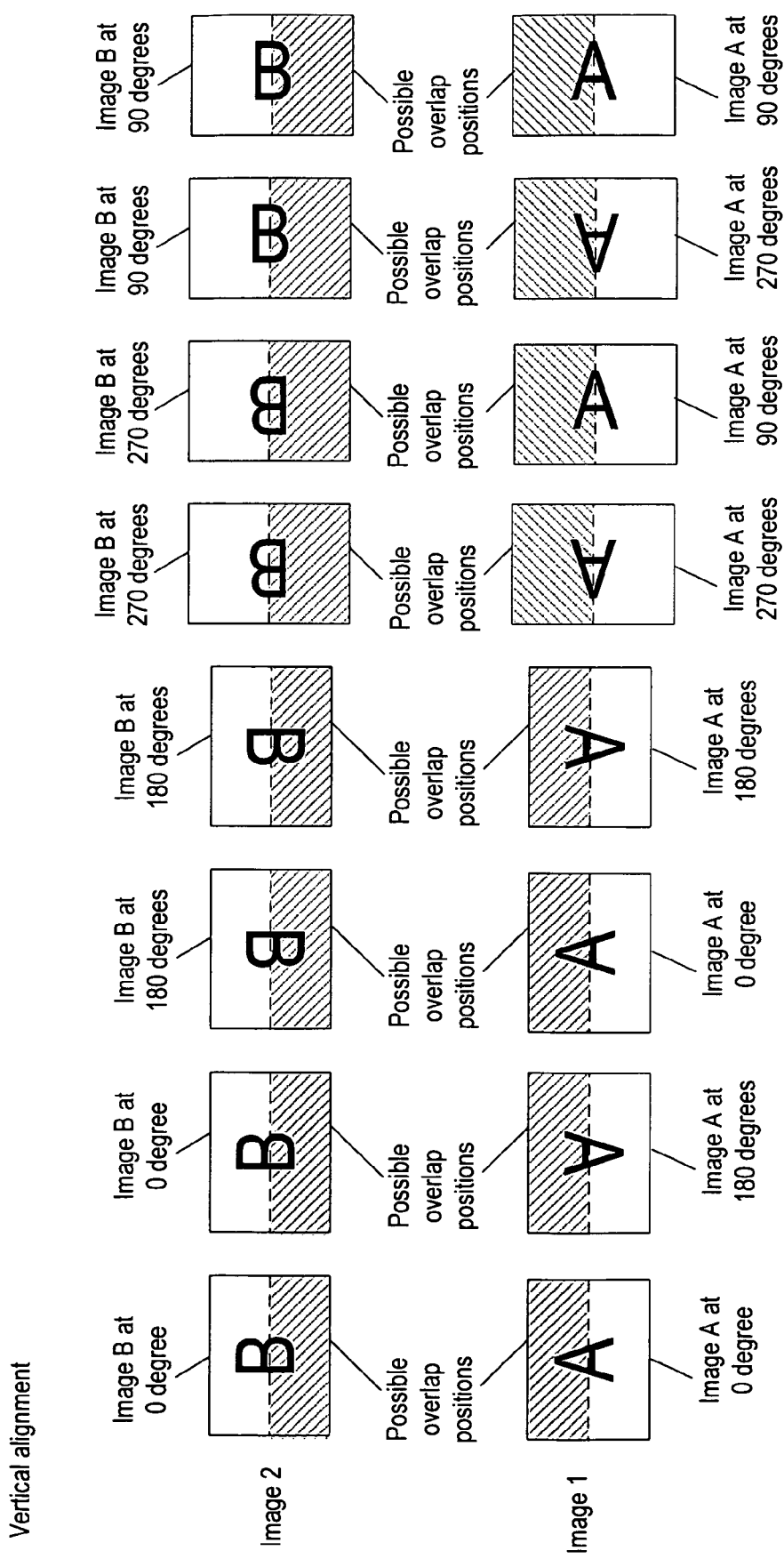
FIGS. 25A, 25B, 26A, and 26B illustrate correlations of scanned images at different orders, alignments, and angles in embodiments of the invention.

Like horizontal correlation values, vertical correlation values are order and angle dependent. FIG. 25A illustrates the possible overlap positions between image A and B when image A is placed ahead of an image B in a vertical correlation. Again, the limited possible overlapping positions prevent the second scanned image from being placed ahead of the first scanned image.

Figure 25B:
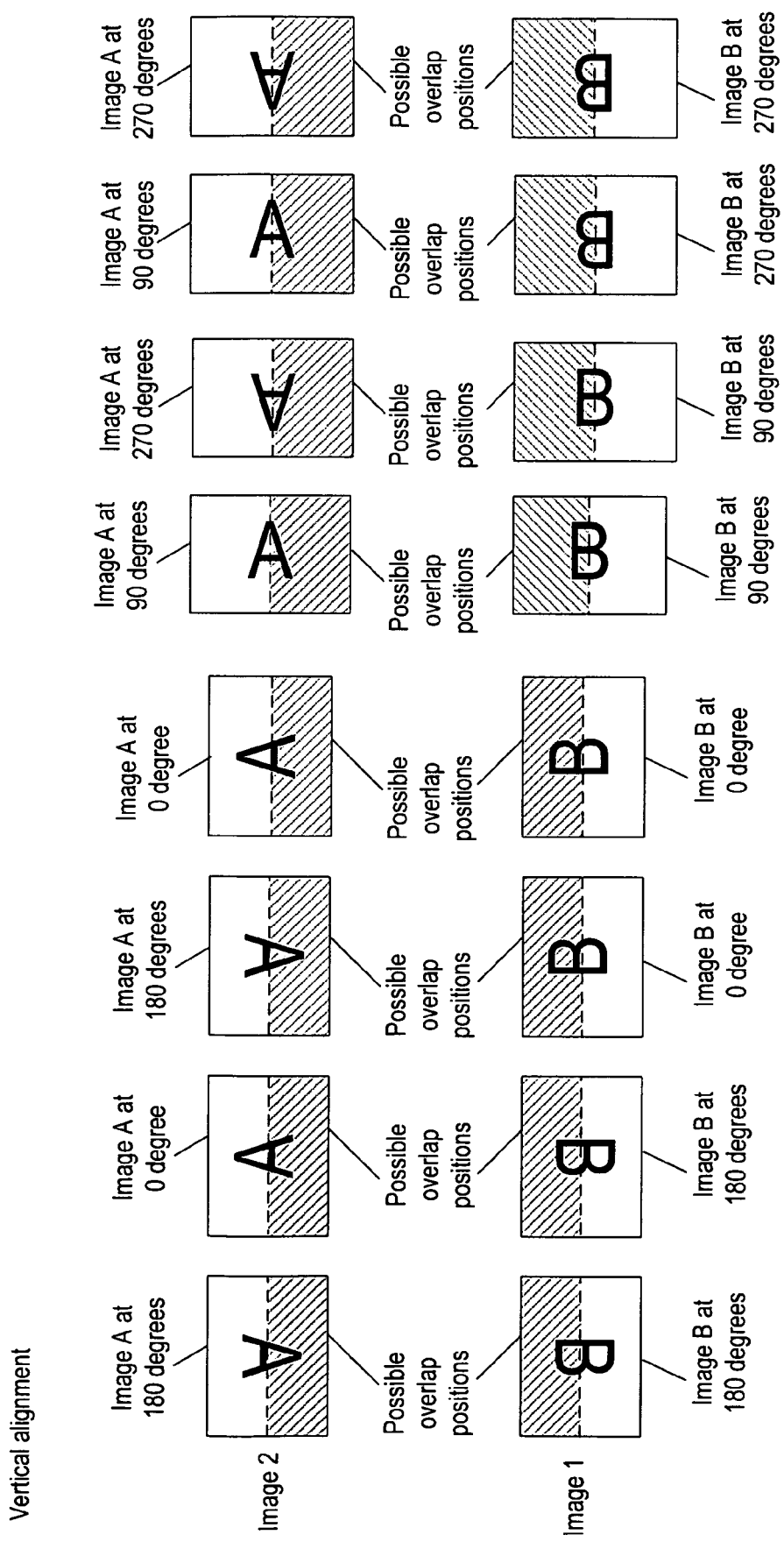

To save time, computer 202 does not calculate the correlation value of every possible comparison since some of them will have the same correlation values. FIG. 25B illustrates that image B placed ahead of image A has the same correlation values as image A placed ahead of image B at corresponding angles in FIG. 25A.

Figure 26A:
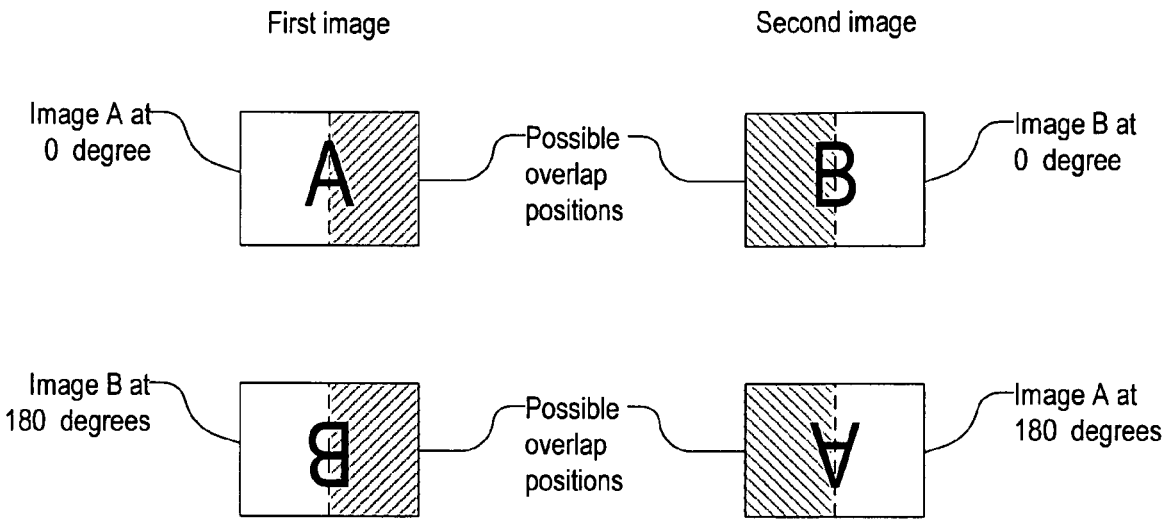
Figure 26B:
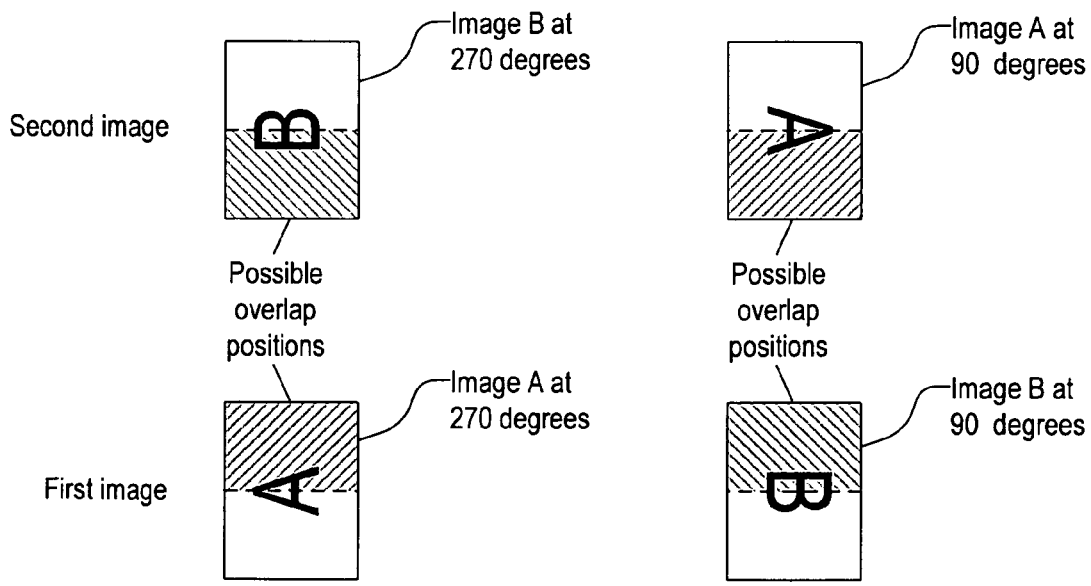

Furthermore, FIGS. 26A and 26B illustrate equivalent scenarios where the horizontal and the vertical correlation values of images A and B share the same values. For example, the horizontal correlation value of image A at 0 degree against image B at 0 degree can be used for (1) the horizontal correlation value of image B at 180 degrees against image A at 180 degrees, (2) the vertical correlation value of image A at 270 degrees against image B at 270 degrees, and (3) the vertical correlation value of image B at 90 degrees against image A at 90 degrees. Step 2203 is followed by step 2204. Thus, the horizontal correlation values of image A against image B (FIG. 17C) can be used for the horizontal correlation values of image B against image A (FIG. 17D), the vertical correlation values of image A against image B (shown partially in FIG. 26B), and the vertical correlation values of image B against image A (shown partially in FIG. 26B).

In step 2204, computer 202 determines the possible dimensions (i.e., numbers of rows and columns) of the array of the scanned images. Computer 202 uses factoring to determine the possible numbers of rows and columns since the total number of scanned images should be a composite number of the numbers of rows and columns. For example, if there is a total of 12 scanned images, then the possible arrays are 2 by 6 and 3 by 4. Note that 6 by 2 and 4 by 3 arrays are not considered since they are equivalent to 2 by 6 and 3 by 4 arrays, respectively. Step 2204 is followed by step 2206.

In step 2206, computer 202 selects one of the possible dimensions. Step 2206 is followed by step 2208.

Figure 23:
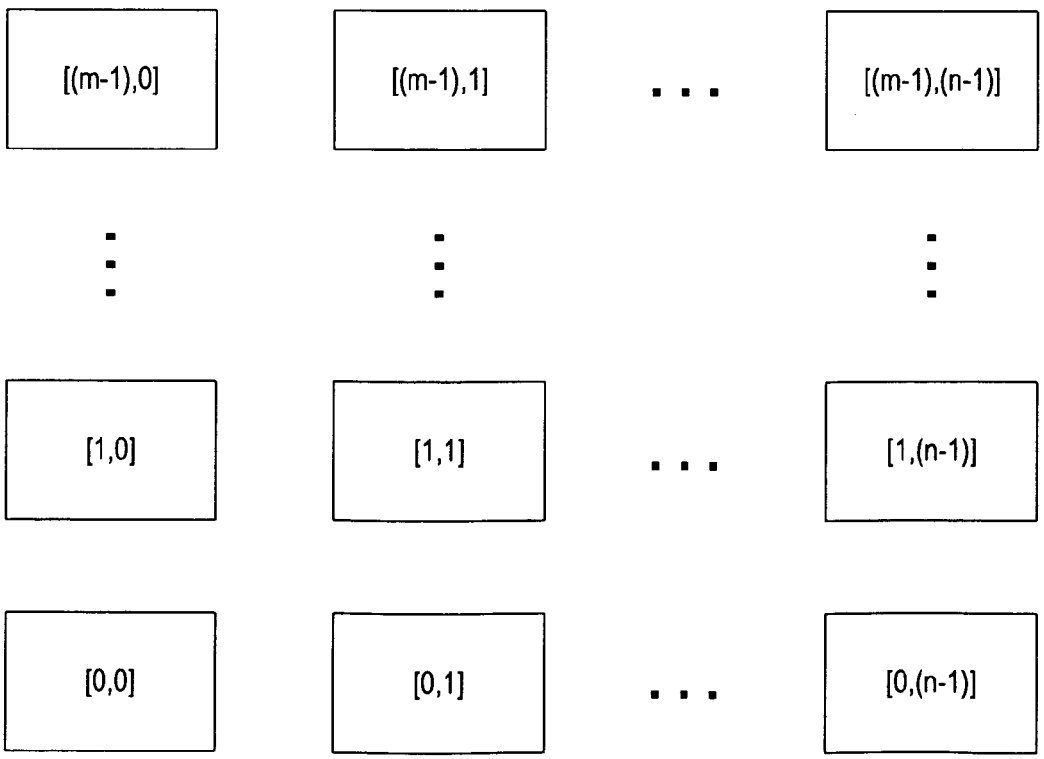
FIG. 23 illustrates a matrix generated by the method of FIGS. 22A and 22B in one embodiment of the invention.

In step 2208, computer 202 creates a matrix and selects one of the scanned images at a specific angle as a possible first image in the first row of the matrix. FIG. 23 illustrates an exemplary matrix having m rows and n columns. Step 2208 is followed by step 2210.

In step 2210, computer 202 selects a next row in the matrix. In the first pass through step 2210, the next row would be the first row of the matrix. Step 2210 is followed by step 2212.

In step 2212, computer 202 determines possible images in the current row from horizontal correlation values of the one or more possible first images in the current row against the remaining images. Computer 202 does this by creating one or more tree data structures from the one or more possible first images using step 1709 (FIGS. 17A and 17B) described above. Step 2212 is followed by step 2214.

In step 2214, computer 202 determines if it has reached the last row of the matrix. If not, step 2214 is followed by step 2216. Otherwise step 2214 is followed by step 2218.

In step 2216, computer 202 determines possible first images in the next row from vertical correlation values of remaining images against the one or more possible images from the current row. For each possible first image in the current row, computer 202 retains at most four remaining images with the smallest correlation values that are less than the correlation threshold. Step 2216 is followed by step 2210.

In step 2218, computer 202 looks up vertical correlation values between possible images that are vertically adjacent to each other in all but the first column of the matrix. Note that a possible image is not correlated against itself in the vertical direction. Step 2218 is followed by step 2220.

In step 2220, computer 202 traverses all possible combinations of the possible images saved in the matrix and determines their sums of the horizontal and vertical correlation values. Note that a possible image can only occur once in each combination. Step 2220 is followed by step 2222.

In step 2222 (FIG. 22B), computer 202 determines if it has tried all scanned images at all angles as a possible first image in the first row of a matrix at the current dimension. If not, step 2222 is followed by step 2208 where computer 202 creates another matrix with another possible first image (a new scanned image or a previous scanned image at a new angle). Otherwise step 2222 is followed by step 2224.

In step 2224, computer 202 determines if it has tried all possible dimensions. If not, step 2224 is followed by step 2206 where computer 202 selects another dimensions. Otherwise step 2224 is followed by step 2226.

In step 2226, computer 202 selects the matrix with the smallest sum of the horizontal and the vertical correlation values. This matrix is then set as the correct stitching order of the scanned images in the array. Computer 202 can use the correct stitching order to create a complete image of the original document and display the complete image to the user.

Figure 24A:
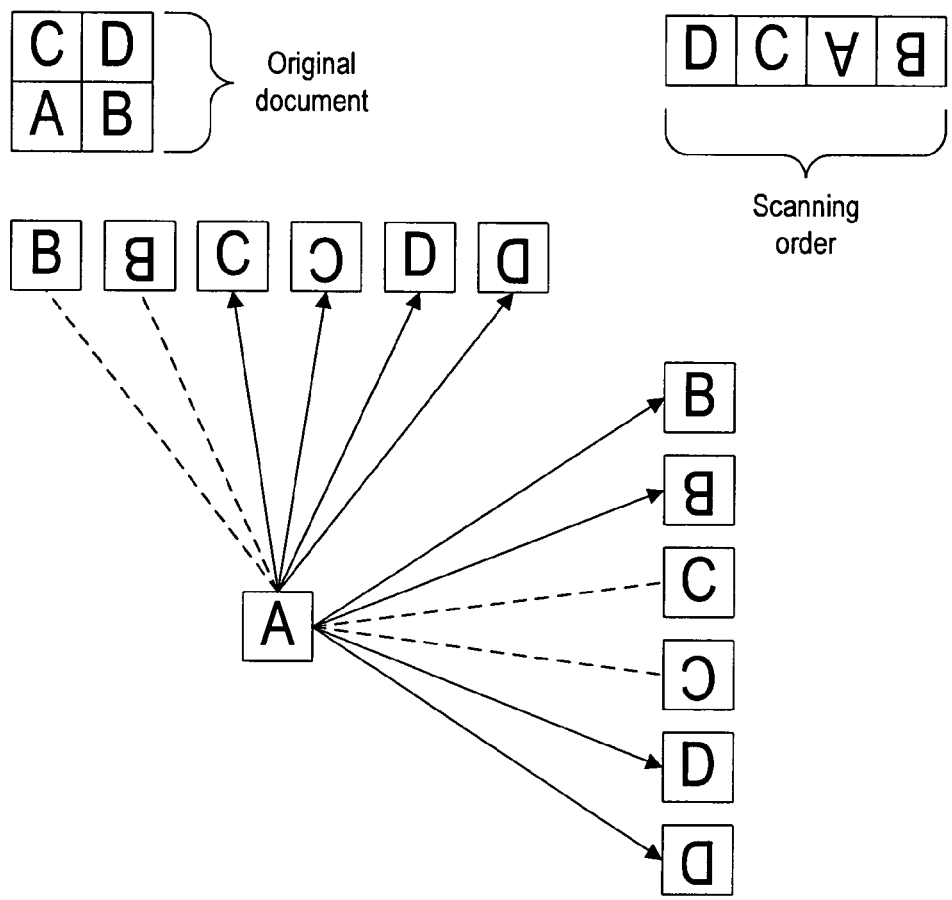
FIGS. 24A, 24B, and 24C illustrate an example of applying the method of FIGS. 22A and 22B in one embodiment of the invention.
Figure 24B:
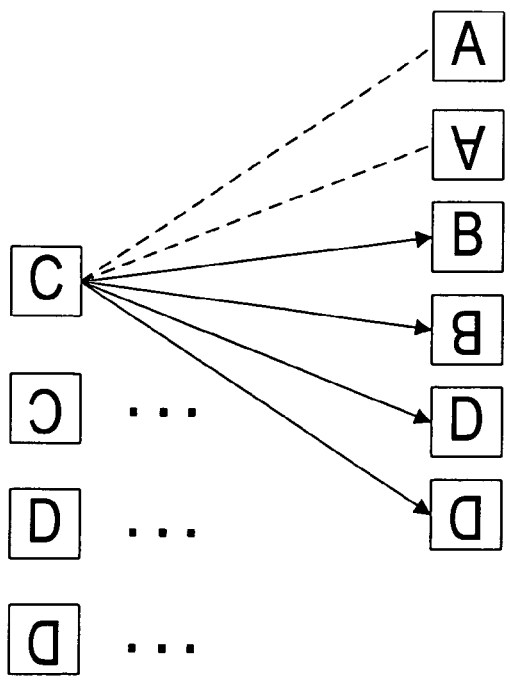
Figure 24C:
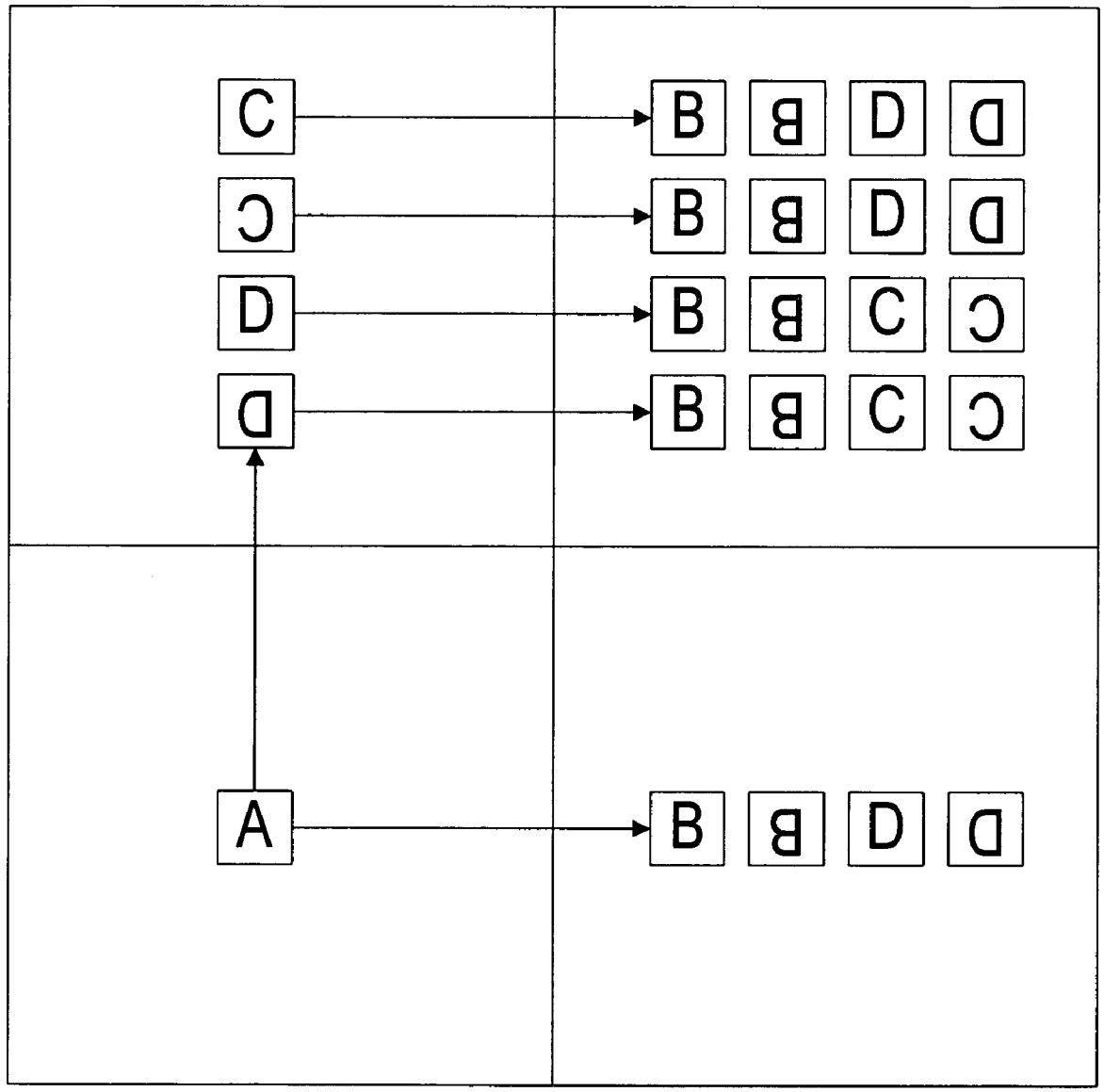

FIGS. 24A, 24B, and 24C illustrate an example of applying method 2200 to an original document in one embodiment of the invention. As can be seen, the original document is scanned as images D, C, A and B in that scanning order with images D and C being at 0 degree and images A and B at 180 degrees. However, the correct stitching order has scanned images A and B at 0 degree in the first row, and images C and D at 0 degree in the second row.

First, images A, B, C, and D are preprocessed. Then, the possible dimensions of the array are determined. Since there are four scanned images, then the dimensions of the array must be 2 by 2. A 2 by 2 matrix is then generated with one of the images at a specific rotational angle saved as a possible first image in the first row of the matrix. This example assumes that image A at 0 degree is saved as the possible first image.

The current row with image A is then selected. Tree data structures are generated assuming image A as the possible first image. As can be seen in FIG. 24A, remaining images B, C, and D at 0 and 180 degrees are correlated against image A. This example assumes that images B and D at 0 and 180 degrees are retained as possible second images in the first row because they correlate best with image A at 0 degree in the horizontal direction and meet the correlation threshold.

When it is determined that the last row has not been reached, possible first images in the next row are determined from image A in the current row. As can be see in FIG. 24A, remaining images B, C, and D at 0 and 180 degrees are correlated against image A. This example assumes that images C and D at 0 and 180 degrees are retained as possible first images in the next row because they correlate best with image A at 0 degree in the vertical direction and meet the correlation threshold.

The method then repeats by selecting the next row with images C and D at 0 and 180 degrees as possible first images in that row. Tree data structures are generated assuming images C and D at 0 and 180 degrees as the possible first images. FIG. 24B illustrates the tree data structures generated for image C at 0 degree. This example assumes that images B and D at 0 and 180 degrees are retained as possible second images in the second row because they correlate best with image C at 0 degree in the horizontal direction and meet the correlation threshold.

FIG. 24C illustrates all the possible second images in the second row and their dependence on the possible first images in the second row. When it is determined that the last row has been reached, vertical correlation values between images in the columns of the matrix are determined. Specifically, vertical correlation values between possible second images in the first and the second rows are calculated. All combinations of the possible images in the matrix are traversed and their sums of the horizontal and the vertical correlation values determined.

The above method is not repeated for any other dimensions since the array can only be 2 by 2. The above method is then repeated for all scanned images at all angles as the possible first image in the first row. Then a combination from the matrices with the smallest sum of the horizontal and the vertical correlation values is set as the correct stitching order for scanned images.

Various other adaptations and combinations of features of the embodiments disclosed are within the scope of the invention. Numerous embodiments are encompassed by the following claims.

What is claimed is:

1. A method for arranging images in a stitching order, comprising:
    applying a gradient filter to the images;
    determining correlation values of each image rotated at first and second angles against other images rotated at the first and the second angles;
    determining correlation values of each image rotated at third and fourth angles against the other images rotated at the third and the fourth angles;
    creating, using a microprocessor, tree data structures having the images at the first, the second, the third, and the fourth angles as root nodes;
    for each tree data structure:
        for each node level in the tree data structure:
            for each image in the node level:
                when the image is at the first or the second angle, saving, using the microprocessor, in nodes that branch from the image in the tree data structure at most four images at the first or the second angle that match best with the image and have respective correlation values meeting a correlation threshold;
                when the image is at the third or the fourth angle, saving, using the microprocessor, in the nodes that branch from the image in the tree data structure at most four images at the third or the fourth angle that match best with the image and have respective correlation values meeting the correlation threshold;
    selecting, using the microprocessor, a path among the tree data structures that comprises a best sum of correlation values as the stitching order.

2. The method of claim 1, further comprising, prior to said applying a gradient filter, reducing resolution of the images.

3. The method of claim 1, wherein the at most four images at the first or the second angle and the at most four images at the third or the fourth angle do not include any images in any ancestor node upstream in the tree data structure.

4. The method of claim 1, wherein:
    said determining correlation values of each image rotated at first and second angles against other images rotated at the first and the second angles comprises:
        calculating a first plurality of correlation values of a first image rotated at the first and the second angles against a second image rotated at the first and the second angles;
        determining a second plurality of correlation values of the second image rotated at the first and the second angles against the first image rotated at the first and the second angles from corresponding correlation values in the first plurality of correlation values;
    said determining correlation values of each image rotated at third and fourth angles against the other images rotated at the third and the fourth angles comprises:
        calculating a third plurality of correlation values of the first image rotated at the third and the fourth angles against the second image rotated at the third and the fourth angles;
        determining a fourth plurality of correlation values of the second image rotated at the third and the fourth angles against the first image rotated at the third and the fourth angles from corresponding correlation values in the third plurality of correlation values.

5. The method of claim 1, wherein said applying a gradient filter comprises applying a Sobel filter to the images.

6. The method of claim 1, wherein the first angle is 0 degrees, the second angle is 180 degrees, the third angle is 90 degrees, and the fourth angle is 270 degrees.

7. The method of claim 1, wherein a smaller correlation value indicates a better match between two images than a larger correlation value, and the best sum of correlation values comprises a smallest sum of correlation values.

8. The method of claim 1, further comprising:
creating an image of an original document by stitching the images in the stitching order; and
displaying the image to a user.

9. A method for arranging images in an array, comprising:
applying a gradient filter to the images;
determining horizontal correlation values between pairs of the images;
determining vertical correlation values between the pairs of the images;
determining possible dimensions of the array from factors of a total number of the images;
for each possible dimension, creating, using a microprocessor, matrices with the images at first, second, third, and fourth angles as first images in first rows of the matrices:
  for each matrix:
    (1) determining, using the microprocessor, possible images for a current row of the matrix from the horizontal correlation values;
    (2) determining, using the microprocessor, possible first images of a next row from one or more possible first images in the current row from the vertical correlation values;
    (3) repeating steps (1) and (2) for remaining rows in the matrix;
    (4) looking up, using the microprocessor, respective vertical correlation values between possible images in all but a first column of the matrix;
determining, using the microprocessor, sums of horizontal and vertical correlation values in combinations of possible images in the matrices; and
selecting, using the microprocessor, a combination with a best sum of horizontal and vertical correlation values as a stitching order for the array.

10. The method of claim 9, wherein each said determining possible images for a current row of the matrix comprises:
creating at least one tree data structure having a possible first image as a root node;
for each node level:
  for each image in the node level:
    when the image is at the first or the second angle, saving in nodes that branch from the image in the tree data structure at most four images at the first or the second angle that match best with the image and have respective correlation values meeting a correlation threshold;
    when the image is at the third or the fourth angle, saving in the nodes that branch from the image in the tree data structure at most four images at the third or the fourth angle that match best with the image and have respective correlation values meeting the correlation threshold.

11. The method of claim 9, further comprising:
creating an image of an original document by stitching the images arranged in the array; and
displaying the image to a user.

12. The method of claim 9, wherein a horizontal correlation value between two images comprises:
determining correlation values between the two images in their overlapping areas along their left and right perimeters; and
selecting a best correlation value as the horizontal correlation value of the two images.

13. The method of claim 9, wherein a vertical correlation values between two images comprises:
determining correlation values between the two images in their overlapping areas along their top and bottom perimeters; and
selecting a best correlation value as the vertical correlation value of the two images.

14. A method to automatically arrange images, comprises:
applying a gradient filter to the images to generate gradient images;
applying an exhaustive search for a stitching order of the images that produces a best sum of correlation values between the gradient images, comprising:
  determining correlation values of each gradient image rotated at first and second angles against other images rotated at the first and the second angles;
  determining correlation values of each gradient image rotated at third and fourth angles against the other images rotated at the third and the fourth angles;
  creating, using a microprocessor, a tree data structure having one of the gradient images as a root node;
  for each node level in the tree data structure:
    for each gradient image in the node level:
      when the gradient image is at the first or the second angle, saving, using the microprocessor, in nodes that branch from the gradient image in the tree data structure at most four gradient images at the first or the second angle that match best with the gradient image and have respective correlation values meeting a correlation threshold; and
      when the gradient image is at the third or the fourth angle, saving, using the microprocessor, in the nodes that branch from the gradient image in the tree data structure at most four gradient images at the third or the fourth angle that match best with the gradient image and have respective correlation values meeting the correlation threshold;
  selecting, using the microprocessor, a path in the tree data structure that comprises the best sum of correlation values as the stitching order.

15. A non-transitory computer-readable storage medium encoded with executable instructions for execution by a microprocessor to arrange images in a stitching order, the executable instructions comprising:
applying a gradient filter to the images;
determining correlation values of each image rotated at first and second angles against other images rotated at the first and the second angles;
determining correlation values of each image rotated at third and fourth angles against the other images rotated at the third and the fourth angles;
creating tree data structures having the images at the first, the second, the third, and the fourth angles as root nodes;
for each tree data structure:
  for each node level in the tree data structure:
    for each image in the node level:

when the image is at the first or the second angle, saving in nodes that branch from the image in the tree data structure at most four images at the first or the second angle that match best with the image and have respective correlation values meeting a correlation threshold;

when the image is at the third or the fourth angle, saving in the nodes that branch from the image in the tree data structure at most four images at the third or the fourth angle that match best with the image and have respective correlation values meeting the correlation threshold;

selecting a path among the tree data structures that comprises a best sum of correlation values as the stitching order.

16. The non-transitory computer-readable storage medium of claim 15, wherein the at most four images at the first or the second angle and the at most four images at the third or the fourth angle do not include any images in any ancestor node upstream in the tree data structure.

17. The non-transitory computer-readable storage medium of claim 15, wherein:

said determining correlation values of each image rotated at first and second angles against other images rotated at the first and the second angles comprises:

calculating a first plurality of correlation values of a first image rotated at the first and the second angles against a second image rotated at the first and the second angles;

determining a second plurality of correlation values of the second image rotated at the first and the second angles against the first image rotated at the first and the second angles from corresponding correlation values in the first plurality of correlation values;

said determining correlation values of each image rotated at third and fourth angles against the other images rotated at the third and the fourth angles comprises:

calculating a third plurality of correlation values of the first image rotated at the third and the fourth angles against the second image rotated at the third and the fourth angles;

determining a fourth plurality of correlation values of the second image rotated at the third and the fourth angles against the first image rotated at the third and the fourth angles from corresponding correlation values in the third plurality of correlation values.

18. The non-transitory computer-readable storage medium of claim 15, wherein the executable instructions further comprise:

creating an image of an original document by stitching the images in the stitching order; and displaying the image to a user.

19. A non-transitory computer-readable storage medium encoded with executable instructions for execution by a microprocessor to arrange images in an array, the executable instructions comprising:

applying a gradient filter to the images;

determining horizontal correlation values between pairs of the images;

determining vertical correlation values between the pairs of the images;

determining possible dimensions of the array from factors of a total number of the images;

for each possible dimension, creating matrices with the images at first, second, third, and fourth angles as first images in first rows of the matrices:

for each matrix:
(1) determining possible images for a current row of the matrix from the horizontal correlation values;
(2) determining possible first images of a next row from one or more possible first images in the current row from the vertical correlation values;
(3) repeating steps (1) and (2) for remaining rows in the matrix;
(4) looking up respective vertical correlation values between possible images in all but a first column of the matrix;

determining sums of horizontal and vertical correlation values in combinations of possible images in the matrices; and selecting a combination with a best sum of horizontal and vertical correlation values as a stitching order for the array.

20. The non-transitory computer-readable storage medium of claim 19, wherein each said determining possible images for a current row of the matrix comprises:

creating at least one tree data structure having a possible first image as a root node;

for each node level:
for each image in the node level:
when the image is at the first or the second angle, saving in nodes that branch from the image in the tree data structure at most four images at the first or the second angle that match best with the image and have respective correlation values meeting a correlation threshold;
when the image is at the third or the fourth angle, saving in the nodes that branch from the image in the tree data structure at most four images at the third or the fourth angle that match best with the image and have respective correlation values meeting the correlation threshold.

21. The non-transitory computer-readable storage medium of claim 19, wherein the executable instructions further comprise:

creating an image of an original document by stitching the images arranged in the array; and displaying the image to a user.

22. The non-transitory computer-readable storage medium of claim 19, wherein a horizontal correlation value between two images comprises:

determining correlation values between the two images in their overlapping areas along their left and right perimeters; and selecting a best correlation value as the horizontal correlation value of the two images.

23. The non-transitory computer-readable storage medium of claim 19, wherein a vertical correlation values between two images comprises:

determining correlation values between the two images in their overlapping areas along their top and bottom perimeters; and selecting a best correlation value as the vertical correlation value of the two images.

24. A non-transitory computer-readable storage medium encoded with executable instructions for execution by a microprocessor to automatically arrange images, the executable instructions comprising:

applying a gradient filter to the images to generate gradient images;

applying an exhaustive search for a stitching order of the images that produces a best sum of correlation values between the gradient images, comprising:
  determining correlation values of each gradient image rotated at first and second angles against other images rotated at the first and the second angles;
  determining correlation values of each gradient image rotated at third and fourth angles against the other images rotated at the third and the fourth angles;
  creating a tree data structure having one of the gradient images as a root node;
  for each node level in the tree data structure:
    for each gradient image in the node level:
      when the gradient image is at the first or the second angle, saving in nodes that branch from the gradient image in the tree data structure at most four gradient images at the first or the second angle that match best with the gradient image and have respective correlation values meeting a correlation threshold; and
      when the gradient image is at the third or the fourth angle, saving in the nodes that branch from the gradient image in the tree data structure at most four gradient images at the third or the fourth angle that match best with the gradient image and have respective correlation values meeting the correlation threshold;
  selecting a path in the tree data structure that comprises the best sum of correlation values as the stitching order.

* * * * *